United States Patent [19]
Howard

[11] 3,983,430
[45] Sept. 28, 1976

[54] ELECTRIC GENERATOR
[76] Inventor: Gerald T. Howard, Rte. 7, Box 606, Augusta, Ga. 30906
[22] Filed: Sept. 11, 1975
[21] Appl. No.: 612,322

Related U.S. Application Data
[63] Continuation-in-part of Ser. No. 463,484, April 24, 1974, abandoned.

[52] U.S. Cl. .............................. 310/155; 310/168
[51] Int. Cl.² ........................................ H02K 21/38
[58] Field of Search ..................... 310/155, 168, 268

[56] References Cited
UNITED STATES PATENTS

| | | | |
|---|---|---|---|
| 3,261,998 | 7/1966 | Bosco, Jr. et al. | 310/268 X |
| 3,401,287 | 9/1968 | French et al. | 310/268 X |
| 3,431,444 | 3/1969 | Wilson | 310/168 |

Primary Examiner—Donovan F. Duggan
Attorney, Agent, or Firm—Watson, Cole, Grindle & Watson

[57] ABSTRACT

A generator capable of producing electric current includes at least one stationary permanent magnet or electromagnet aligned with at least one stationary core of non-permanent magnetic material provided with an induction field coil winding. The poles of the aligned magnet and core face one another on opposite sides of a magnetic flux field suppressor in the form of a rotary disc. This disc has alternating equal width sectors of a magnetic material and sectors of a non-magnetic material, the former being comprised of a plurality of magnetic sheets interleaved with thin strips of non-magnetic material.

4 Claims, 6 Drawing Figures

U.S. Patent  Sept. 28, 1976  3,983,430
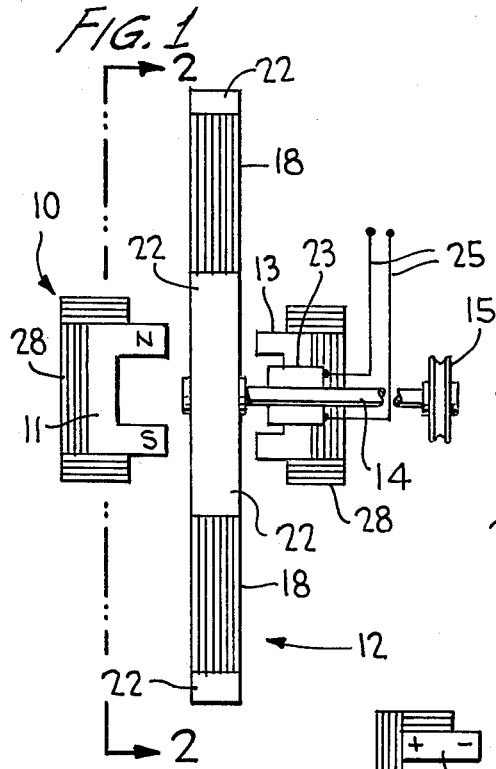
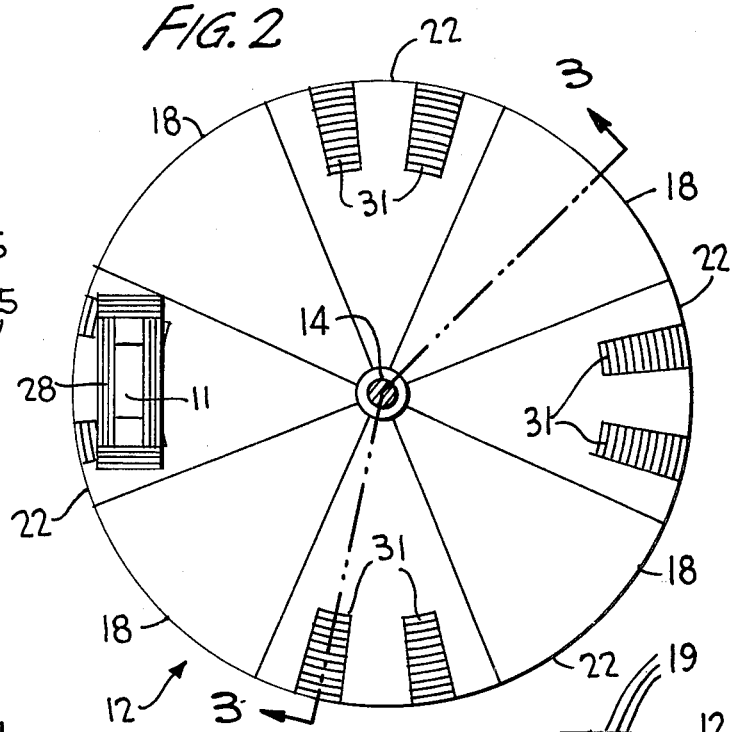
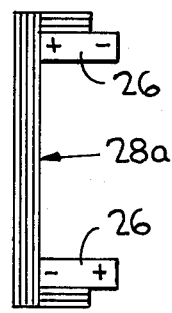
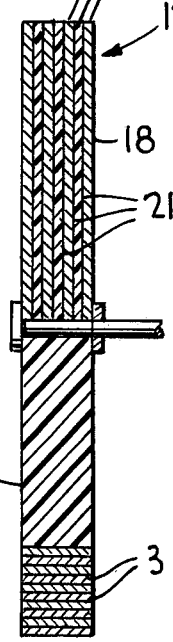
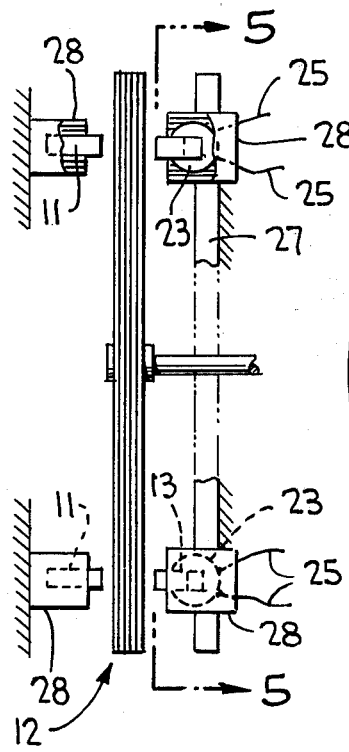
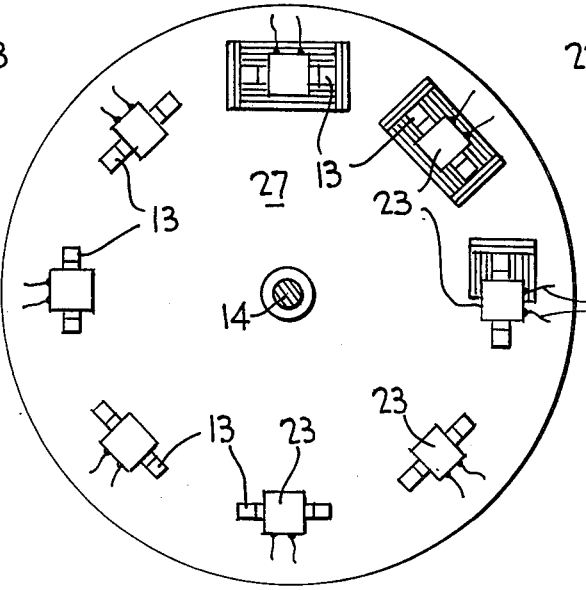

ELECTRIC GENERATOR

This application is a Continuation-In-Part of U.S. Ser. No. 463,484 filed Apr. 24, 1974, now abandoned.

This invention relates generally to an electric generator and more particularly to the use of a stationary permanent magnet or electromagnet aligned with a core of non-permanent magnetic material surrounded by a wound coil in which an electric voltage and current is induced by the magnetic flux lines being redirected from in their path through the coil core by alternating magnetic and non-magnetic sectors on a rotary disc disposed between the magnet and core causing a redirection or focusing of the magnetic field of the magnet. The rotary disc is unique in that it concentrates and focuses the flux lines allowing normally unusable lines of force to be used to produce more power than possible with solid material rotors.

In the apparatus of the present invention there is provided a stationary, permanent magnet or electromagnet closely adjacent one side of a rotatable magnetic flux field suppressor. A stationary core formed of non-permanent magnetic material is disposed closely adjacent the opposite side of the suppressor in alignment with the magnet poles. This core is provided with a field winding and the poles of the magnet and the core face one another. The suppressor is in the form of a circular rotary disc having alternate sectors of magnetic material and sectors of non-magnetic material. Thin magnetic sheets interleaved with non-magnetic material form the magnetic sectors. The magnetic flux lines between the magnet and through the core pass through the non-magnetic sectors of the disc upon rotation thereof, such lines being redirected and focused by the magnetic sectors of the disc as they are guided along the sheets of the disc to thereby alternately induce an electric voltage and current in the induction coil by alternately moving the magnetic field out of the core and then allowing it to re-expand back into the core. The provision of such an apparatus forms the principal object of the present invention.

In accordance with another object, a plurality of such magnets and cores with windings are provided on opposite sides of the rotary disc in respective alignment with one another, with their poles likewise facing one another. Rotation of the disc permits the magnetic lines of flux between aligned magnets and through the cores to pass through the non-magnetic portions of the discs and to be redirected and focused by the magnetic sectors of the discs to thereby alternately induce a voltage and current in each of the coils provided on each of the cores by moving the field out of the cores and then allow it to re-expand back into the cores.

A further object of this invention is to provide such an apparatus wherein each of the magnets and cores is partially encased within a shell comprised of stacked non-permanent magnetic sheets interleaved with thin layers of non-magnetic material so as to prevent flux lines between adjacent magnets and cores from interfering with one another. Their poles protrude from the shells so as not to have their flux lines interfered with by the shell cases.

A still further object is to provide a magnetic field bridge of strips of non-permanent magnetic material embedded within the non-magnetic sectors, with each of the strips being in alignment with the facing poles between the magnet and core so as to guide and focus the magnetic lines of flux therethrough to provide a higher flux fluid density from the poles of the magnets through the cores of the induction coils.

Other objects, advantages and novel features of the invention will become more apparent from the following detailed description of the invention when taken in conjunction with the accompanying drawings wherein:

FIG. 1 is a plan view of the electric generator in accordance with the present invention with the disc offset from the aligned magnet and core;

FIG. 1A is a plan view of al alternative embodiment of the stationary magnet of FIG. 1 wherein two bar or oriented magnets or electromagnets are used with a flux field suppressor interconnecting the magnets so as to effect a horseshoe-type flux field;

FIG. 2 is a sectional view taken along line 2—2 of FIG. 1, the suppressor being shown in plan view in relation thereto;

FIG. 3 is a cross-sectional view of the suppressor taken along line 3—3 of FIG. 2;

FIG. 4 is a plan view of an electric generator similar to FIG. 1 except that a plurality of magnets and cores with windings are provided; and FIG. 5 is a plan view of the plurality of cores taken along line 5—5 of FIG. 4.

Turning now to the drawings wherein like reference characters refer to like and corresponding parts throughout the several views, the apparatus generally designated 10 forming an electric generator is shown in FIG. 1 as comprising a stationary, permanent horseshoe-type magnet or electromagnet 11, a magnetic flux field suppressor 12 driven by a power source driving pulley 15 coupled to shaft 14, and a stationary core 13 formed of a non-permanent magnetic material. Member 12 is referred to as a magnetic flux field suppressor since it, as will be shown hereinafter, serves to allow passage therethrough, and to suppress, guide and focus magnetic flux lines in a more efficient and effective manner as required to induce a voltage and current in coil 23. Member 12 is in the form of a disc mounted on shaft 14 for rotation therewith, the shaft being operatively rotated via pulley 15 coupled to shaft 14, when a rotating power input is attached to the pulley 15. Magnet 11 is in close proximity to one side of the disc, core 13 being likewise in close proximity to the other side of the disc. The axis through shaft 14 of the disc is offset from the aligned magnet and core, as shown in FIG. 2. The disc is formed of a plurality of alternate sectors 18 (FIG. 3) of stacked, thin magnetic sheets 19 interleaved with thin layers 21 of non-magnetic material such as aluminum, lead, organic resin, or the like. The disc is further formed of sectors 22 of non-magnetic material located between and adjacent sectors 18. These sectors 22 may be of any non-magnetic material such as aluminum plastic material, air or the like.

Magnetic conducting core 13 can be seen in FIG. 1 as having an induction field core 23 thereon with output ends 25 extending therefrom to provide an output for the electric voltage and current generated by the present apparatus. Alternating current is produced by coils 23 when the generator is operated. Rectifiers can convert this alternating current to direct current.

As mentioned earlier, shaft 14 of the disc is offset from the axis of aligned magnet 11 and core 13, with both the magnet and core being so disposed that their poles will be confined within one of the sectors 18 and 22 as shown in FIG. 2. Therefore, each time a non-magnetic sector 22 is aligned with the aligned magnet and core, during rotation of the disc, the magnetic lines of flux of the magnet expand outwardly and pass through the coil and core thereby inducing a voltage and current. These flux lines are rerouted, concentrated and redirected in a path parallel to 18 each time sectors 18 of the disc move into alignment with the magnet and core. During these repeated flux field manipulations by disc 12, the magnetic lines of flux of the magnet are guided along sheets 19 in close proximity to magnet 11 but not beyond the body of 18, whereby an electric voltage and current is induced in coil 23. Sheets 19 of the disc manipulate the field of magnet 11 so that sheets 19 pass through the field generally along the length of the magnetic flux lines rather than across them so that less outside power is required to rotate the disc through the magnetic field than if the flux lines were cut or crossed at 90° of the line of travel of the flux field. If the magnetic flux lines are traversed by a conductor, more power is required to push such conductor through the magnetic field when the conductor is moving across the magnetic lines at 90° to their propagation, especially if a current is drawn from the conductor, as in accordance with Lenz' Law. On the other hand, magnetic conductors moving in the same plane as the magnetic flux lines require substantially less energy to pass along the magnetic field on each revolution, especially if no current is drawn from the conductor portion of the disc 12. The magnetic flux field suppressor of the invention generally does not cut the magnetic lines of force but simply provides pathways for these lines by reason of sheets 19 which are more permeable than air, so that the magnetic lines of force travel parallel therethrough rather than in their normal curved path if such sheets were not provided. The current induced in coil 23 provides the power output for the apparatus through leads 25.

The short legs of induction core 13 serve to improve the total proximity of the coil and core to the magnets and improve the proximity of the pathway for the magnetic flux lines to therefore permit a higher flux density from the magnets to pass through the coil core because of its closer proximity to the magnets than would be possible with a thicker solid rotor. And, by reason of the relatively thin cross-section of the disc and shorter legs for the coil core, it is possible that a higher density of the magnetic flux field is encountered in the core of the coil, and more magnetic flux lines are permitted to pass through the coil assembly to increase power input. If the coil pathway is too long, the magnetic flux lines will leave the core prematurely or may not enter it at all and may even fail to provide the required field for the generator to produce power at all.

Bar magnets 26 shown in FIG. 1A may be used in lieu of the horseshoe-type magnet 11. These bar magnets in the generator are mounted with their resulting fields aligned in the same manner as horseshoe magnet 11, and are disposed relative to suppressor 12 in the same manner as described with reference to FIG. 1. Stationary flux field suppressor 28a converts the magnet's individual fields into a resulting field configuration similar to that produced by the horseshoe magnet.

In accordance with another embodiment of the invention, a plurality of magnets 11 are fixedly mounted on some suitable support equally spaced apart in a circular array in a position relative to suppressor 12 as in the manner shown in FIG. 4 with their poles aligned generally with the arc line of the disc rotation. Only two of such magnets are shown therein, although any number thereof as desired may be provided in the same relative positions as for example shown in FIG. 5 for the non-permanent magnetic conducting cores 13 provided in this embodiment. These cores are fixedly mounted on a non-magnetic support plate 27 in a circular array near the periphery thereof, and are each closely adjacent suppressor 12 similarly as in the FIG. 1 embodiment. The coil wires or lines 25 of each coil 23 may be suitable combined for a combined electrical output of this embodiment as sectors 18 and 22 of the disc are repeatedly rotated into and out of alignment with the respectively aligned magnets and cores of FIG. 4.

Each of the magnets and cores may be partially encased within a shell 28 wherein each partially surrounds the magnets and the cores with the exception of their pole ends which protrude from the shells. Each shell is comprised of sheets such as 19 of magnetic material interleaved with thin layers 21 of non-magnetic material. In such manner, flux lines between adjacent magnets and cores in especially the FIG. 4 embodiment are prevented from interfering with one another. The magnetic sheets of each shell serve as guides for the magnet lines of flux so as to suppress their travel and maintain the flux lines closely adjacent their respective magnets and cores. It should be noted that such shells are not shown in FIG. 5 in the interest of clarity. Also, bar magnets 26 of the FIG. 1A embodiment are seated within a stationary flux field suppressor 28a likewise comprised of stacked magnetic sheets 19 interleaved with thin layers 21 of non-magnetic material.

As shown in FIGS. 2 and 3, groups of short radial strips 31 of non-permanent magnetic material may be embedded within each of the sectors 22 which serve in more precisely confining the magnetic lines of flux to pass therealong as each sector 22 is moved into alignment between an aligned pair of the magnet and core. For such purpose, strips 31 are located in alignment with the poles of the magnet and core, between magnet 11 and core 13 as the disc 12 rotates.

From the foregoing, it can be seen that a simple and efficient yet highly effective apparatus has been devised for producing electric voltage and current using at least one stationary non-permanent magnetic core surrounded by a field coil in which current is induced as a suppressor disc disposed between magnet and core rotates and manipulate the field of magnet 11. Any number of sheets 19 may be used for the disc, each being relatively thin and of a good permeable magnetic material such as Permalloy. Layers 21 disposed therebetween can be of any suitable non-magnetic material such as aluminum, lead air, glass, wood, organic or inorganic resin, or the like. The layers of non-magnetic material help concentrate flux lines in layers 19 by their lower magnetic permeability than the metal of 19 and the magnetic sheets 19 serve to conduct the magnetic flux lines from pole to pole of magnet 11 with greater permeability than air such that lines of force are contained there in 19. Layers 21 help concentrate flux lines in layers 19 by their lower magnetic permeability than that of sheets 19. The sheets partially surrounding each magnet and core serve to confine the magnetic lines of flux to their respective magnets and cores so as to avoid interference of flux lines between closely adjacent magnets and cores. The poles of the magnets and cores protrude from their shells so that the shells do not interfere with the normal flux fields emanating from the poles.

Obviously, many other modifications and variations are made possible in the light of the above teachings. It is therefore to be understood that within the scope of the appended claims the invention may be practiced otherwise than as specifically described.

What is claimed is:

1. An electric generator comprising:
   at least one stationary magnet and at least one stationary core of non-permanent magnetic material provided with induction field coil windings and disposed in alignment with said magnet with poles facing one another,
   a magnetic flux field suppressor movably mounted between said magnet and said core, said suppressor comprising a rotary circular disc having first portions forming alternate sectors of stacked non-permanent magnetic sheets interleaved with thin layers of non-magnetic material,
   the remaining portions of said disc being sectors of non-magnetic material, said sectors being in alignment with said facing poles,
   means rotating said disc so that, upon rotation of said disc, the magnetic flux lines passing between said aligned magnet and core pass through said remaining portions and through said core and back to said magnet and are redirected and focused by said first portions as said flux lines pass along said sheets to thereby alternately induce and electric voltage and current in said coil as the flux field of said magnet is alternately allowed to pass through said core via said remaining portions of said disc during rotation thereof.

2. The electric generator according to claim 1, wherein a plurality of said magnets are equally spaced apart in a circular array, a plurality of said cores being likewise equally spaced apart and respectively in alignment with said magnets, whereby, upon rotation of said disc, the magnetic flux lines pass between said aligned magnets and cores through said remaining portions and are redirected and focused by said first portions as said flux lines pass along said sheets to thereby intermittently induce an electric voltage and current in said coils.

3. The electric generator according to claim 2, wherein said magnets and said cores are partially encased within shells each comprised of a plurality of non-permanent magnetic sheets interleaved with thin layers of non-magnetic material, the ends of said magnets and cores protruding outwardly of said shells, each said shell preventing flux lines between adjacent magnets and cores from interfering with the potential power output thereof.

4. The electric generator according to claim 1, wherein a plurality of magnetic strips may be embedded within each of said remaining portions, said strips being located in alignment with said facing poles, thereby the magnetic flux lines are guided therealong when passing through said remaining portions.

* * * * *